US010153059B2

(12) United States Patent
Putterman et al.

(10) Patent No.: US 10,153,059 B2
(45) Date of Patent: Dec. 11, 2018

(54) CHARGED PARTICLE ACCELERATION DEVICE

(71) Applicant: The Regents of the University of California, Oakland, CA (US)

(72) Inventors: Seth J. Putterman, Malibu, CA (US); Jonathan Hird, Cambridge (GB); Brian Naranjo, Garden Grove, CA (US)

(73) Assignee: The Regents of the University of California, Oakland, CA (US)

(*) Notice: Subject to any disclaimer, the term of this patent is extended or adjusted under 35 U.S.C. 154(b) by 876 days.

(21) Appl. No.: 14/379,950

(22) PCT Filed: Feb. 25, 2013

(86) PCT No.: PCT/US2013/027663
§ 371 (c)(1),
(2) Date: Aug. 20, 2014

(87) PCT Pub. No.: WO2013/126896
PCT Pub. Date: Aug. 29, 2013

(65) Prior Publication Data

US 2016/0035449 A1 Feb. 4, 2016

Related U.S. Application Data

(60) Provisional application No. 61/603,145, filed on Feb. 24, 2012.

(51) Int. Cl.
*G21G 4/00* (2006.01)
*H01J 35/16* (2006.01)
(Continued)

(52) U.S. Cl.
CPC ................. *G21G 1/02* (2013.01); *G21B 1/11* (2013.01); *H05H 15/00* (2013.01)

(58) Field of Classification Search
CPC ... G21C 1/02; G21C 7/00; G21C 7/36; G21G 4/06; G21G 1/02
(Continued)

(56) References Cited

U.S. PATENT DOCUMENTS 4,990,813 A 2/1991 Paramo
7,656,258 B1 2/2010 Antaya et al.
(Continued)

FOREIGN PATENT DOCUMENTS

WO WO-2006-074960 A1 7/2006
WO 2009/102784 A1 8/2009

OTHER PUBLICATIONS

International Search Report and Written Opinion for PCT/US2013/027663.
(Continued)

*Primary Examiner* — Douglas W Owens
*Assistant Examiner* — Wei Chan
(74) *Attorney, Agent, or Firm* — Venable LLP; Henry J. Daley

(57) ABSTRACT

A charged particle acceleration device according to some embodiments of the current invention includes a first triboelectric element, a second triboelectric element arranged proximate the first triboelectric element to be brought into contact with and separated from the first triboelectric element, an actuator assembly operatively connected to at least one of the first and second triboelectric elements to bring the first and second triboelectric elements into contact with each other and to separate the first and second triboelectric elements from each other, and a charged-particle source configured to provide charged particles in a gap between the first and second triboelectric elements.

20 Claims, 3 Drawing Sheets

(51) Int. Cl.

| | |
|---|---|
| ***H01J 35/02*** | (2006.01) |
| ***H01J 35/08*** | (2006.01) |
| ***G21G 1/02*** | (2006.01) |
| ***H05H 15/00*** | (2006.01) |
| ***G21B 1/11*** | (2006.01) |

(58) Field of Classification Search

USPC ..................... 315/505, 169.3, 500, 506, 507; 250/423 R, 251, 390.01, 396 R; 378/119, 378/121, 123, 143, 2; 372/2

See application file for complete search history.

(56) References Cited

U.S. PATENT DOCUMENTS

| | | | | |
|---|---|---|---|---|
| 2002/0100494 | A1* | 8/2002 | Brown | A47L 13/40 134/6 |
| 2007/0252089 | A1* | 11/2007 | Gorrell | G21K 1/087 250/399 |
| 2009/0140603 | A1 | 6/2009 | Aslam | |
| 2009/0290604 | A1* | 11/2009 | Gorrell | H01J 25/00 372/2 |
| 2011/0130613 | A1 | 6/2011 | Putterman et al. | |

OTHER PUBLICATIONS

Apodaca et al., "Contact Electrification between Identical Materials", Angew. Chem. Int. Ed. 49, 946 (2010).

Camara et al., "Mechanically driven millimeter source of nanosecond X-ray pulses", Appl. Phys B. Lasers and Optics 99 613-617 (2010).

Budakian et al., Picosecond discharges and stick-slip friction at a moving meniscus of mercury on glass, Nature 391, 266 (1998).

Camara et al., "Correlation between nanosecond X-ray flashes and stick-slip friction in peeling tape", Nature 455, 1089 (2008).

Harvey, "The Luminescence of Adhesive Tape", Science 89, 460 (1939).

Hird et al., "A triboelectric x-ray source," Appl. Phys. Lett., 98 133501 (2011).

McCarty et al., "Electrostatic Charging Due to Separation of Ions at Interfaces: Contact Electrification of Ionic Electrets", Angew. Chem. Int. Ed. 47, 2188 (2008).

Shaw, "Experiments on Tribo-Electricity. I. The Tribo-Electric Series", Proc. R. Soc. Lond. A 94, 16 (1917).

Stoneham, "Defects in semiconductors and oxides: where are the gaps in first principles theory?", Modeling Simul. Mater. Sci. Eng. 17, 084009 (2009).

* cited by examiner

CHARGED PARTICLE ACCELERATION DEVICE

CROSS-REFERENCE OF RELATED APPLICATION

This is a national stage application under 35 U.S.C. § 371 of PCT/US2013/027663 filed Feb. 25, 2013, the entire contents of which are incorporated herein by reference and this application claims priority to U.S. Provisional Application No. 61/603,145 filed Feb. 24, 2012, the entire contents of which are hereby incorporated by reference.

UNITED STATES FEDERAL GOVERNMENT SUPPORT

This invention was made with Government support under: W81XWH-10-1-1049, awarded by the U.S. Army, Medical Research and Materiel Command. The Government has certain rights in the invention.

BACKGROUND

1. Field of Invention

The field of the currently claimed embodiments of this invention relates to charged particle acceleration devices, and more particularly to triboelectric charged particle acceleration devices.

2. Discussion of Related Art

Triboelectricity has been utilized in fundamental scientific research as a source of high electrostatic potential for over three centuries, from the early electrostatic apparatus of Haukesbee (F. Haukesbee, *Physico-Mechanical experiments on various subjects* (London: 1709)) through to the eponymous generators of van der Graaf, yet there remains a notable absence of a first principles approach to the subject (M. Stoneham, Modelling Simul. Mater. Sci. Eng. 17, 084009 (2009)). Electrostatic generators store the integrated charge that is developed when two materials are rubbed together in frictional contact. The materials are selected to be furthest apart in the triboelectric series—an empirically derived list showing both the propensity of the materials to charge and the polarity of charge (P. E. Shaw, Proc. R. Soc. Lond. A 94, 16 (1917)). At the point of contact between the two materials, the frictional electrification may be of such magnitude that it may ionize the gas surrounding it, creating triboluminescence. The triboluminescence observed during peeling pressure sensitive adhesive (PSA) tape has long attracted scientific attention (E. N. Harvey, Science 89, 460 (1939)) and has an electrostatic origin. When the tape is peeled, charge densities $10^{12}$ e $cm^{-2}$ (where is e is the fundamental charge on the electron) are exposed on the surfaces of the freshly peeled region and subsequently discharge (C. G. Camara, J. V. Escobar, J. R. Hird and S. P. Putterman, Nature 455, 1089 (2008)). If the tape is peeled in vacuum ~10 mTorr, it has been found that the triboluminescence produced extends to X-ray energies (V. V. Karasev, N. A. Krotova and B. W. Deryagin, Dokl. Akad. Nauk. SSR 88 777 (1953)). More recently (Camara, et al., id.), it was found that there are two timescales for tribocharging during the peeling of tape in vacuo: the first, common to electrostatic generators and classic electrostatic experiments (W. R. Harper, *Contact and frictional electrification*, (Oxford University Press, London, 1967)), is the long timescale process which results in an average charge density of $10^{10}$ e $cm^{-2}$ being maintained on the surface of the tape and second, a nanosecond process with charge densities of $10^{12}$ e $cm^{-2}$. In addition, it was found that the X-ray discharge from peeling tape was sufficiently self-collimated at the peel line to resolve the inter-phlangeal spacing of a human digit. The emission of nanosecond X-ray pulses allowed an estimate of the emission region to be calculated. Subsequent research on peeling PSA tape with a width of 1.5 mm has confirmed that the process takes place at dimensions less than 300 μm (C. G. Camara, J. V. Escobar, J. R. Hird and S. P. Putterman, Appl. Phys. B 99, 613 (2010)).

Underpinning this recent work on triboelectricity is a resurgence of interest in how charge transfer occurs between different materials and particularly between polymers. Particularly intriguing is the report of like-polymers charging each other (M. M. Apodaca, P. J. Wesson, K. J. M. Bishop, M. A. Ratner and B. A. Grzybowski, Angew. Chem. Int. Ed. 49, 946 (2010)). More fundamentally, an open question is whether the transfer particle is an ion (L. McCathy and G. M. Whitesides, Angew. Chem. Int. Ed. 47, 2188 (2008)) or an electron (Harper, id.)—a matter that is still debated despite centuries of experimental research. Whether the charge carriers responsible for tribocharging are electrons or ions, what is clear is that very large charge densities are readily generated. For the most effective charging to occur, intimate contact between the materials and cleanliness of the contacting surfaces is important (R. Budakian, K. Weninger, R. A. Hiller and S. P. Putterman, Nature 391, 266 (1998)).

Mechanoluminescent x-ray generators appear to have a fundamental limitation regarding the maximum energy of x-rays they can obtain (~50 kV). Furthermore, the x-ray flux is limited via a poorly understood process whereby the polymer that acts as the 'electron gun' (in the x-ray tube sense) restricts the electron current that flows when the plates are separated. Therefore, there remains a need for improved triboelectric charged particle acceleration devices.

SUMMARY

A charged particle acceleration device according to some embodiments of the current invention includes a first triboelectric element, a second triboelectric element arranged proximate the first triboelectric element to be brought into contact with and separated from the first triboelectric element, an actuator assembly operatively connected to at least one of the first and second triboelectric elements to bring the first and second triboelectric elements into contact with each other and to separate the first and second triboelectric elements from each other, and a charged-particle source configured to provide charged particles in a gap between the first and second triboelectric elements. The first and second triboelectric elements include triboelectric materials that become charged with respect to each other by a triboelectric interaction such that an electric field is established between the first and second triboelectric elements when they are separated from each other by the actuator assembly. The charged-particle source is configured to provide the charged particles in the gap between the first and second triboelectric elements to be accelerated towards one of the first and second triboelectric elements by the electric field.

A method of producing nuclear isotopes according to some embodiments of the current invention includes providing a triboelectric charged particle acceleration device that is configured to generate fusion reactions, providing a target material comprising nuclear elements to be transformed into heavier isotopes by exposure to neutrons, and operating the triboelectric charged particle acceleration device to generate fusion reactions so as to provide a source of neutrons resulting from said fusion reaction. The operating of the triboelectric charged particle acceleration device is performed such that the target material is exposed to neutrons from the source of neutrons resulting from the fusion reaction.

BRIEF DESCRIPTION OF THE DRAWINGS

Further objectives and advantages will become apparent from a consideration of the description, drawings, and examples.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

As noted in the previous section, mechanoluminescent x-ray generators appear to have a fundamental limitation regarding the maximum energy of x-rays they can obtain (~50 kV). Furthermore, the x-ray flux is limited via a poorly understood process whereby the polymer that acts as the 'electron gun' (in the x-ray tube sense) restricts the electron current that flows when the plates are separated. In other words, in these devices, triboelectric material 1 is responsible for providing both the high voltage field and the accelerated electrons. Replacing this electron source using a separate electron emitting element, according to an embodiment of the current invention, can circumvent these limitations. The vacuum pressure can now be lowered according to some embodiments of the current invention and the separation of materials increased. This increases the accelerating field and allows for the theoretical flux based on the triboelectric charge density to be realized. Greater energies can also be realized.

Accordingly, some embodiments of the current invention are directed to a low voltage, compact source of high-energy electromagnetic radiation. Although x-ray generation is one application of the current invention, we stress that this invention is not mechanoluminescence in the proper sense of the word. Embodiments of this device use triboelectricity to produce a strong electric field which is then seeded with electrons and/or other charged particles using a separate element. In triboluminescence, the electrons come from the same materials which also set up the field. Applications may include, but are not limited to, areas such as those requiring fusion reactions, medicine, isotope manufacture, x-ray generation, and pulsed x-ray generation for x-ray movies.

Figure 1:
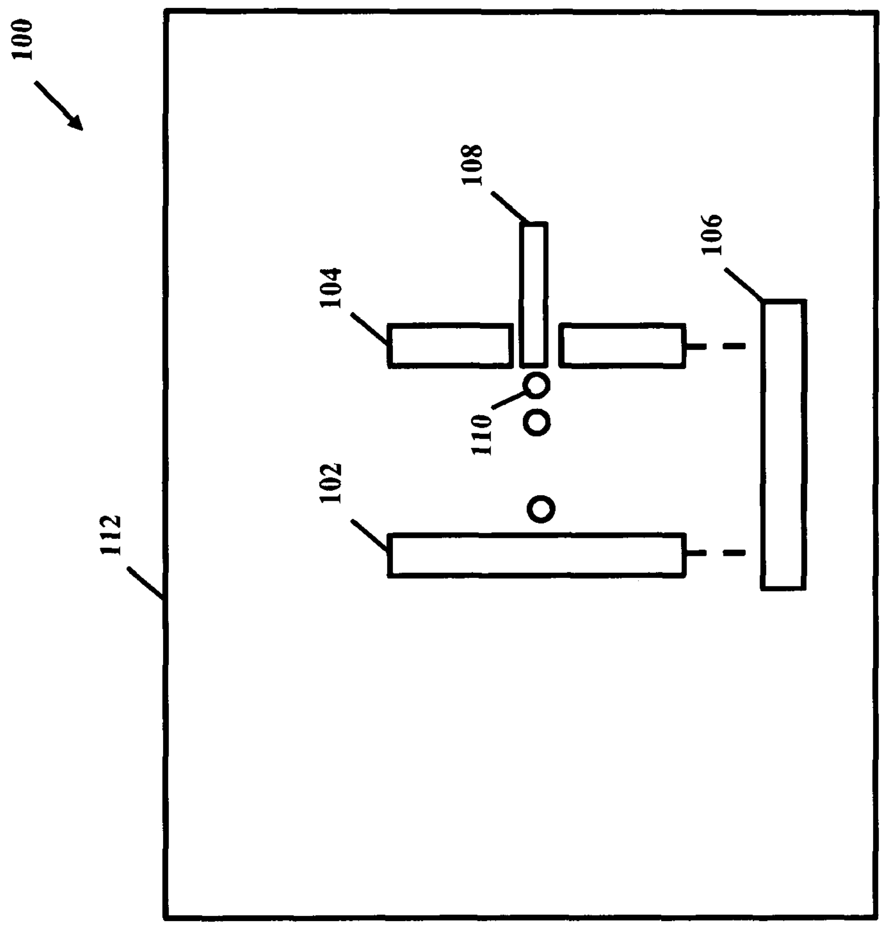
FIG. 1 is a schematic illustration of a charged particle acceleration device according to an embodiment of the current invention.

FIG. 1 is a schematic illustration of a charged particle acceleration device 100 according to an embodiment of the current invention. The charged particle acceleration device 100 includes a first triboelectric element 102, and a second triboelectric element 104 arranged proximate the first triboelectric element 102 to be brought into contact with and separated from the first triboelectric element 102. The charged particle acceleration device 100 also includes an actuator assembly 106 operatively connected to at least one of the first and second triboelectric elements (102, 104) to bring the first and second triboelectric elements (102, 104) into contact with each other and to separate the first and second triboelectric elements (102, 104) from each other. The charged particle acceleration device 100 also includes a charged-particle source 108 configured to provide charged particles (e.g., charged particle 110) in a gap between the first and second triboelectric elements (102, 104). The first and second triboelectric elements (102, 104) include triboelectric materials that become charged with respect to each other by a triboelectric interaction such that an electric field is established between the first and second triboelectric elements (102, 104) when they are separated from each other by the actuator assembly 106. The charged-particle source is configured to provide the charged particles in the gap between the first and second triboelectric elements (102, 104) to be accelerated towards one of the first and second triboelectric elements (102, 104) by the electric field. In some embodiments, the charged particle acceleration device 100 also includes a containment vessel 112 adapted to provide at least one of a vacuum or an atmosphere of a selected gas at a selected pressure.

The charged particles, such as charged particle 110, can be either positively charged, or negatively charged particles. For example, the charged particles can be electrons or either positively charged or negatively charged ions. The term "ions" is intended to include the nuclei of hydrogen, deuterium and tritium (i.e., protons, deuterons and tritons). The general concepts of the current invention are not limited to only these examples. Heavier ions can also be provided in some embodiments of the current invention. In the case of negative charged particles 110, the first triboelectric element 102 contains a triboelectric material that becomes positively charged while the second triboelectric element 104 contains a triboelectric material that becomes negatively charged such that particles 110 accelerate to, and impinge upon, the first triboelectric element 102. In the case of positive charged particles 110, the first triboelectric element 102 contains a triboelectric material that becomes negatively charged while the second triboelectric element 104 contains a triboelectric material that becomes positively charged such that particles 110 accelerate to, and impinge upon, the first triboelectric element 102. The triboelectric materials can be selected from known triboelectric materials to suite the particular application.

The actuator assembly 106 can be selected from a wide range of possible assemblies. For example, the actuator assembly 106 can use piezoelectricity, clockwork, electromechanical force, magnetostriction, or human energy or another means to effect motion. Either one of the first and second triboelectric elements (102, 104), or both, can be moved by the actuator assembly 106, depending on the particular application.

In some embodiments, the charged-particle source 108 is an electron source. In some embodiments, the triboelectric element 104 can include a triboelectric material that charges with a negative charge by the triboelectric interaction to provide a cathode. The triboelectric material is a photoconductive material and the electron source includes a light source arranged to illuminate at least a portion of the triboelectric material such that the electrons provided by the electron source are provided by a photoelectric effect. The light source can be an ultraviolet light source in some embodiments.

Figure 2:
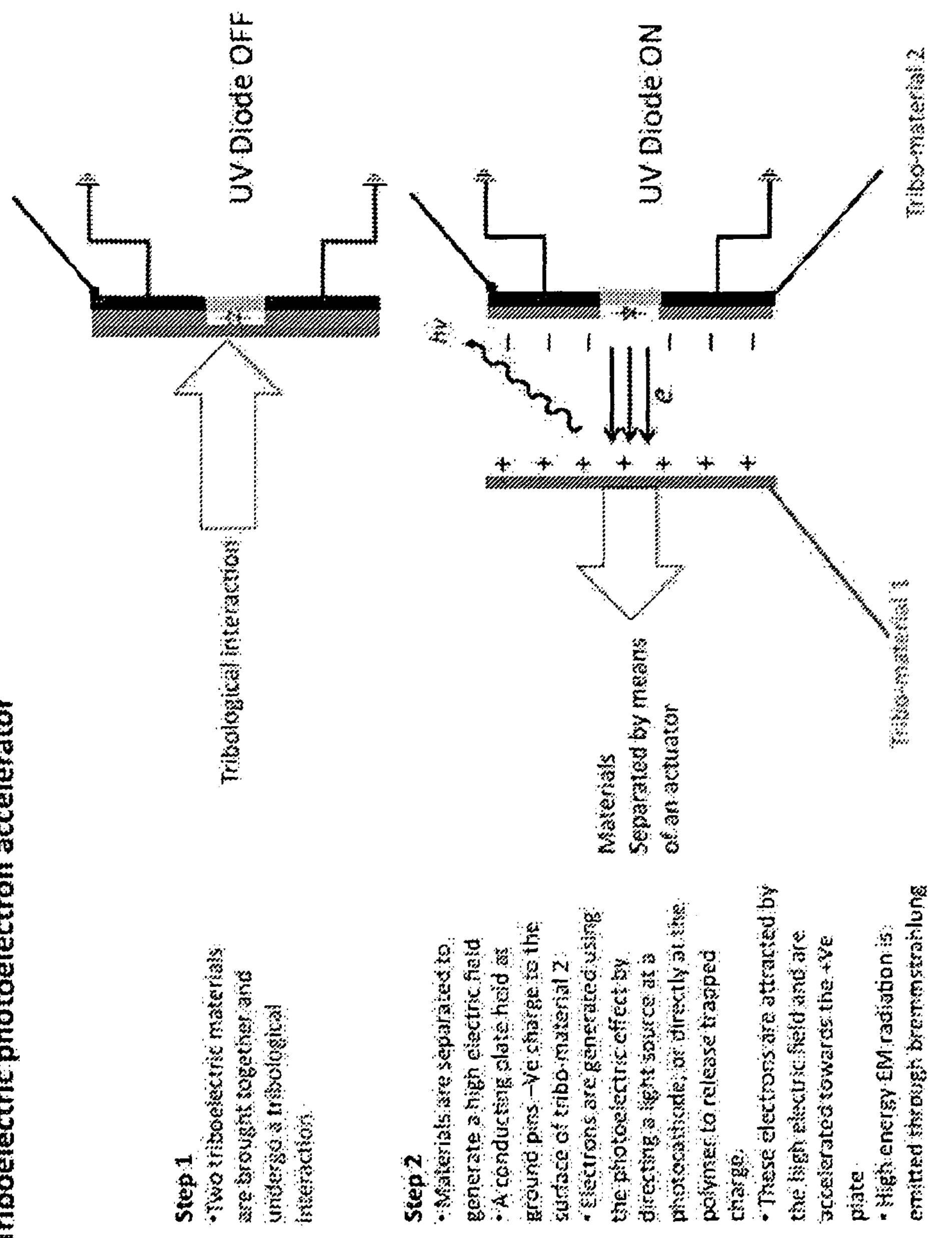
FIG. 2 is a schematic illustration of an electron acceleration device according to an embodiment of the current invention.
Figure 3:
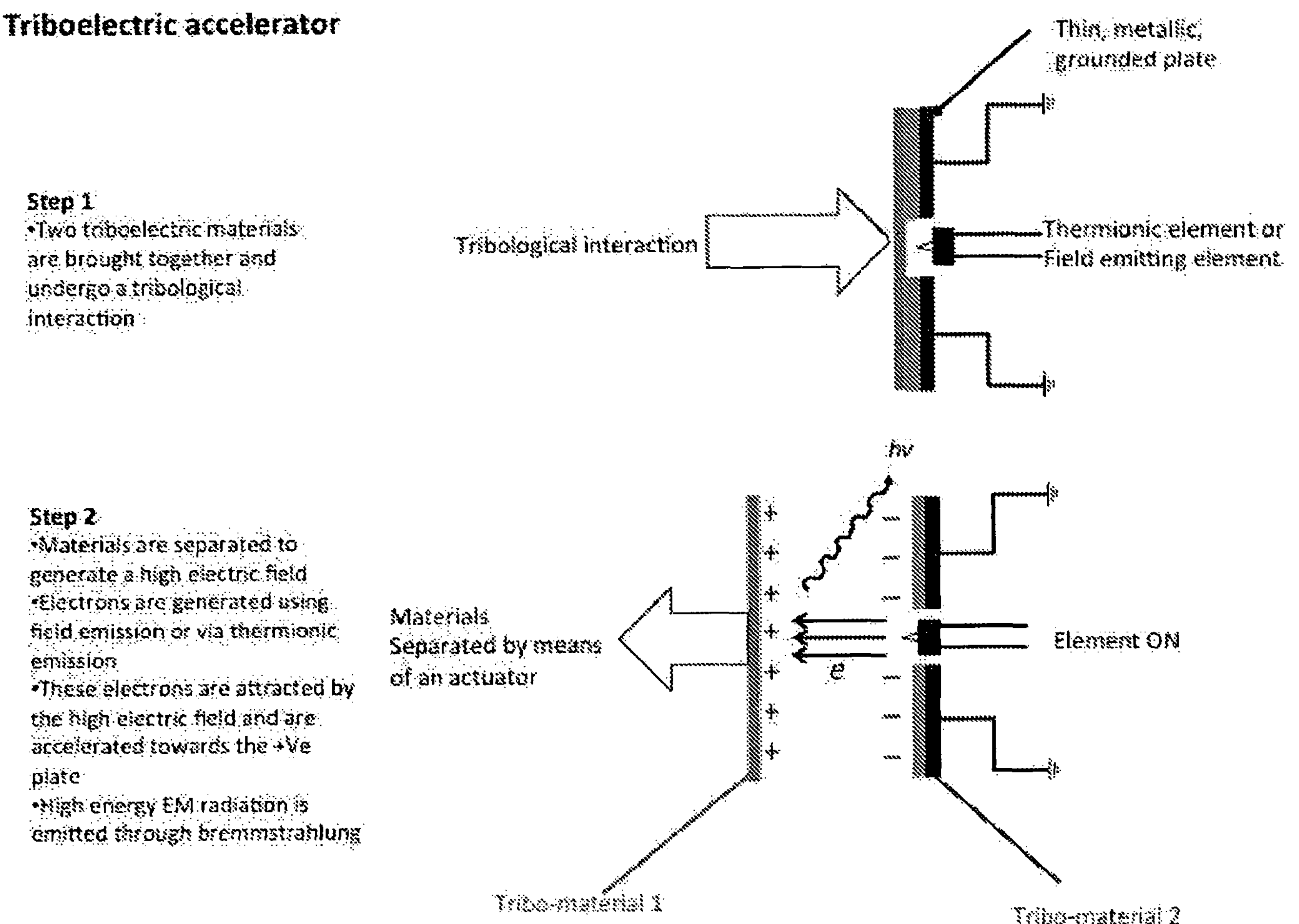
FIG. 3 is a schematic illustration of an electron acceleration device according to another embodiment of the current invention.

FIG. 2 is a schematic illustration of a charged particle acceleration device according to an embodiment of the current invention in which the electron source is a photoelectric element. FIG. 3 is a schematic illustration of a charged particle acceleration device according to an embodiment of the current invention in which the electron source includes a thermionic emitting element.

In the embodiment of FIG. 2, the triboelectric photoelectron accelerator has two dissimilar materials, material 1 and material 2, which have the property of being able to exchange electrical charge when subject to a tribological interaction (rubbing, contacting, brushing etc.) in a vacuum. These materials are then separated by some means for example using an actuator (e.g. a device which uses piezoelectricity, clockwork, electromechanical force, magnetostriction, or human energy or another means to effect motion). Material 1 charges electrically in a −Ve sense relative to material 2 and a strong electric field is set up when they are separated.

In some embodiments of the current invention, the Material 1 can be both triboelectrically active and photoconductive. The purpose of this is that when the material becomes charged negatively (through the process as described above) most polymers we have looked at appear to have an inherent property which inhibits the flow of charge to the anode. If, however, the polymer becomes conducting, this surface charge will agglomerate and start to field emit from sharp points on the surface towards the triboelectric anode. Some embodiments can include a high power LED or other light source which is directed at the cathode and illuminated when the desired separation between material 1 and 2 is reached. The surface of Material 1 can also contain a metallic tip such that charge will flow to this instead of encountering bottlenecks etc.

In another embodiment, ultraviolet light from a source (e.g. ultraviolet light from a LED, super-luminescent diode, laser, high pressure lamp bulb) is focused onto a third material (material 3) positioned close to −Ve material 1. Material 3 is chosen to possess a work function that is lower than the energy of the ultraviolet light in order to induce that material to emit electrons via the photoelectric effect. Examples of such materials include alkali metal compounds, metals, polymers, ceramics, liquids, gases and combinations thereof. When the photoelectrons are emitted from material 3 they are immediately attracted by the strong electric field that exists between materials 1 and 2 and are accelerated towards material 2 which is +Ve. When they strike material 2, high-energy electromagnetic radiation is emitted. In another embodiment, ultraviolet light is directed at material 1 to release electrons trapped in surface states.

In the embodiment of FIG. 3, a thermionic source of electrons, i.e a cathode from a material comprising either yttria, lanthanum hexaboride, tantalum, tungsten and barium, their oxides, compounds and ceramics thereof is used to seed the triboelectric field with electrons. However, the material of the cathode is not limited to only these examples. This source can be screened using an external bias when it is not required, enabling the electron (and thus the x-ray source) to be pulsed.

Another embodiment of the current invention uses field emission as the source of electrons. In any of the embodiments of the device listed above, grounding of the cathode side to prevent trickle can be implemented. Having the cathode grounded also makes it easier to inject external electrons from a grounded source without losing any acceleration potential (otherwise, you lose half). So that the device works in a cycle, the cathode side should be somewhat electronically conducting. Rubber containing conducting dopants such as carbon or metal impurities can be utilized, or the cathode can be photoconductive.

Devices according to some embodiments of the current invention can find application where high-energy electromagnetic radiation is used and/or needed and may open up new market areas due it's low voltage requirements and compactness.

In an embodiment, the triboelectric accelerator includes two dissimilar materials, tribo-material 1 and tribo-material 2, which have the property of being able to exchange electrical charge when subject to a tribological interaction (rubbing, contacting, brushing etc.) in a vacuum. These materials are then separated by some means for example using an actuator (e.g. a device which uses piezoelectricity, clockwork, electromechanical force, magnetostriction, or human energy or another means to effect motion). Tribo-material 1 charges electrically in a −Ve sense relative to tribo-material 2 and a strong electric field is set up when they are separated. An electron is then seeded into the field in one of a number of ways, e.g., via the photoelectric effect, by thermionic emission, field emission or discharge using a heat source.

In the embodiment of FIG. 3, a thermoionic or a field emission source is used to introduced electrons into the electric field set up by the triboelectric effect. In this example, a metallic film is in close proximity to a thin film of the cathode polymer (triboelectric element 2), which pins the electric charge to the surface of the polymer preventing the self-emitted electrons (the trickle) from traversing the gap to the anode. The electron source is turned on or pulsed when the plates are at maximum separation. When the external source of electrons is not needed, a bias can be used to shield the electrons from the triboelectric field. This bias can be pulsed rapidly as needed and in synchrony to the separation of the triboelectric plates.

In another embodiment, a source of heat (e.g. a radiant heat source (i.e. IR lamp, laser, filament), or other heater (i.e resistance, inductive, microwave) is used to drive electrons off the −Ve charged material.

The following references are incorporated by reference. In the general area of contact electrification there have been several innovations emanating from Seth Putterman's lab. WO/2009/102784: Mechanoluminescent x-ray generator. Also, see Nature 455 1089-1092 (2008) and in Appl. Phys B. Lasers and Optics 99 613-617 (2010). Another embodiment of a triboelectric x-ray source is described in Hird, J. R., Camara, C. G. & Putterman, S. J. A triboelectric x-ray source, Appl. Phys. Lett. 98 133501 (2011). Additional results are described in UCLA Case No. 2011-425 (Application Ser. No. 61/451,694 filed Mar. 11, 2011); and UCLA Case No. 2011-707 (Application Ser. No. 61/482,031 filed May 3, 2011).

In some embodiments, the source of charged particles is a source of ions such as, but not limited to, protons, deuterons and/or tritons (i.e., the nuclei of hydrogen, deuterium or tritium). The negative side can furthermore be made from a polymer or material which has deuterons or tritons replacing the hydrogen. So now when ions strike the surface they provide fusion. The neutrons from the fusion can then be used to make isotopes when they strike a third body.

In one embodiment, the charged particle acceleration device includes an atmosphere of low pressure deuterium gas or tritium gas in the containment vessel. A tip can be mounted on the plus surface. The tip feels the potential of the surface and ionizes the gas and then the ion accelerates. Alternatively, a commercially available ion emitter can be used.

Another embodiment of the current invention provides a method of producing nuclear isotopes. The method includes providing a triboelectric charged particle acceleration device that is configured to generate fusion reactions, providing a target material that includes nuclear elements to be transformed into heavier isotopes by exposure to neutrons, and operating the triboelectric charged particle acceleration device to generate fusion reactions so as to provide a source of neutrons resulting from said fusion reaction. The operating of the triboelectric charged particle acceleration device is performed such that the target material is exposed to neutrons from the source of neutrons resulting from the fusion reaction.

Mechanoluminescent x-ray generators appear to have a fundamental limitation regarding the maximum energy of x-rays they can obtain (~50 kV). Furthermore, the x-ray flux is limited via a poorly understood process whereby the polymer that acts as the 'electron gun' (in the x-ray tube sense) restricts the electron current that flows when the plates are separated. In other words, in these devices triboelectric material 1 is responsible for providing both the high voltage field and the accelerated electron. Replacing this electron source using a separate photoelectric, thermionic or field emission element, for example, can thus circumvent these limitations. The vacuum pressure can now be lowered to realize high value and so the separation of materials can be increased. This increases the accelerating field and allows for the theoretical flux based on the triboelectric charge density to be realized. In some embodiments, greater energies can also be realized. Additional uses can include fusion reactions, medicine, isotope manufacture, x-ray generation, pulsed x-ray generation for x-ray movies, for example.

The embodiments illustrated and discussed in this specification are intended only to teach those skilled in the art how to make and use the invention. In describing embodiments of the invention, specific terminology is employed for the sake of clarity. However, the invention is not intended to be limited to the specific terminology so selected. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A charged particle acceleration device, comprising:

a first triboelectric element;

a second triboelectric element arranged proximate said first triboelectric element to be brought into contact with and separated from said first triboelectric element;

an actuator assembly operatively connected to at least one of said first and second triboelectric elements to bring said first and second triboelectric elements into contact with each other and to separate said first and second triboelectric elements from each other; and a charged-particle source configured to provide charged particles in a gap between said first and second triboelectric elements, wherein said first and second triboelectric elements comprise triboelectric materials that become charged with respect to each other by a triboelectric interaction such that an electric field is established between said first and second triboelectric elements when they are separated from each other by said actuator assembly, and wherein said charged-particle source is configured to provide said charged particles in said gap between said first and second triboelectric elements to be accelerated towards one of said first and second triboelectric elements by said electric field.

2. A charged particle acceleration device according to claim 1, wherein said charged-particle source is an electron source.

3. A charged particle acceleration device according to claim 2, wherein said electron source is a photoelectric element.

4. A charged particle acceleration device according to claim 3, wherein said first triboelectric element comprises a first triboelectric material that charges with a negative charge by said triboelectric interaction to provide a cathode, wherein said first triboelectric material is a photoconductive material, and wherein said electron source comprises a light source arranged to illuminate at least a portion of said first triboelectric material such that said electrons provided by said electron source are provided by a photoelectric effect.

5. A charged particle acceleration device according to claim 4, wherein said light source is a source of ultraviolet light.

6. A charged particle acceleration device according to claim 5, wherein source of ultraviolet light comprises at least one of a light-emitting diode, a super-luminescent diode, a laser, or a high pressure lamp bulb.

7. A charged particle acceleration device according to claim 3, wherein said photoelectric element comprises a photoconductive element and a light source arranged to illuminate said photoconductive element such that said electrons provided by said electron source are photoelectrons from said photoconductive element.

8. A charged particle acceleration device according to claim 7, wherein said light source is a source of ultraviolet light.

9. A charged particle acceleration device according to claim 8, wherein source of ultraviolet light comprises at least one of a light-emitting diode, a super-luminescent diode, a laser, or a high pressure lamp bulb.

10. A charged particle acceleration device according to claim 8, wherein said photoconductive element is an ultraviolet diode.

11. A charged particle acceleration device according to claim 2, wherein said electron source is a thermoionic source.

12. A charged particle acceleration device according to claim 2, wherein said electron source is a field emission source.

13. A charged particle acceleration device according to claim 2, wherein said electron source comprises a heat source arranged to heat an element to free electrons from said element.

14. A charged particle acceleration device according to claim 13, wherein said heat source is at least one of a radiant heat source, a resistive heat source, an inductive heat source, or a microwave heat source.

15. A charged particle acceleration device according to claim 1, wherein said charged-particle source is an ion source.

16. A charged particle acceleration device according to claim 15, wherein said ion source is a source of at least one of protons, deuterons or tritons.

17. A charged particle acceleration device according to claim 16, wherein said first triboelectric element comprises a first triboelectric material that charges with a negative charge by said triboelectric interaction to provide a cathode, wherein said first triboelectric material is a polymer having at least one of deuterium or tritium substituted for hydrogen, and wherein said ion source provides said at least one of protons, deuterons or tritons proximate said second triboelectric element to be accelerated to said first triboelectric element to provide fusion reactions with at least some of said at least one of deuterium or tritium in said first triboelectric material.

18. A charged particle acceleration device according to claim 1, further comprising a containment vessel adapted to provide at least one of a vacuum or an atmosphere of a selected gas at a selected pressure.

19. A charged particle acceleration device according to claim 16, further comprising a containment vessel adapted to provide at least one of a vacuum or an atmosphere of a selected gas at a selected pressure.

20. A charged particle acceleration device according to claim 19, further comprising a gas within said containment vessel, said gas comprising at least one of hydrogen, deuterium or tritium.

* * * * *